AUGUST GOTTSCHALK.
Improvement in Apparatus for Clarifying Wines.
No. 119,460. Patented Oct. 3, 1871.
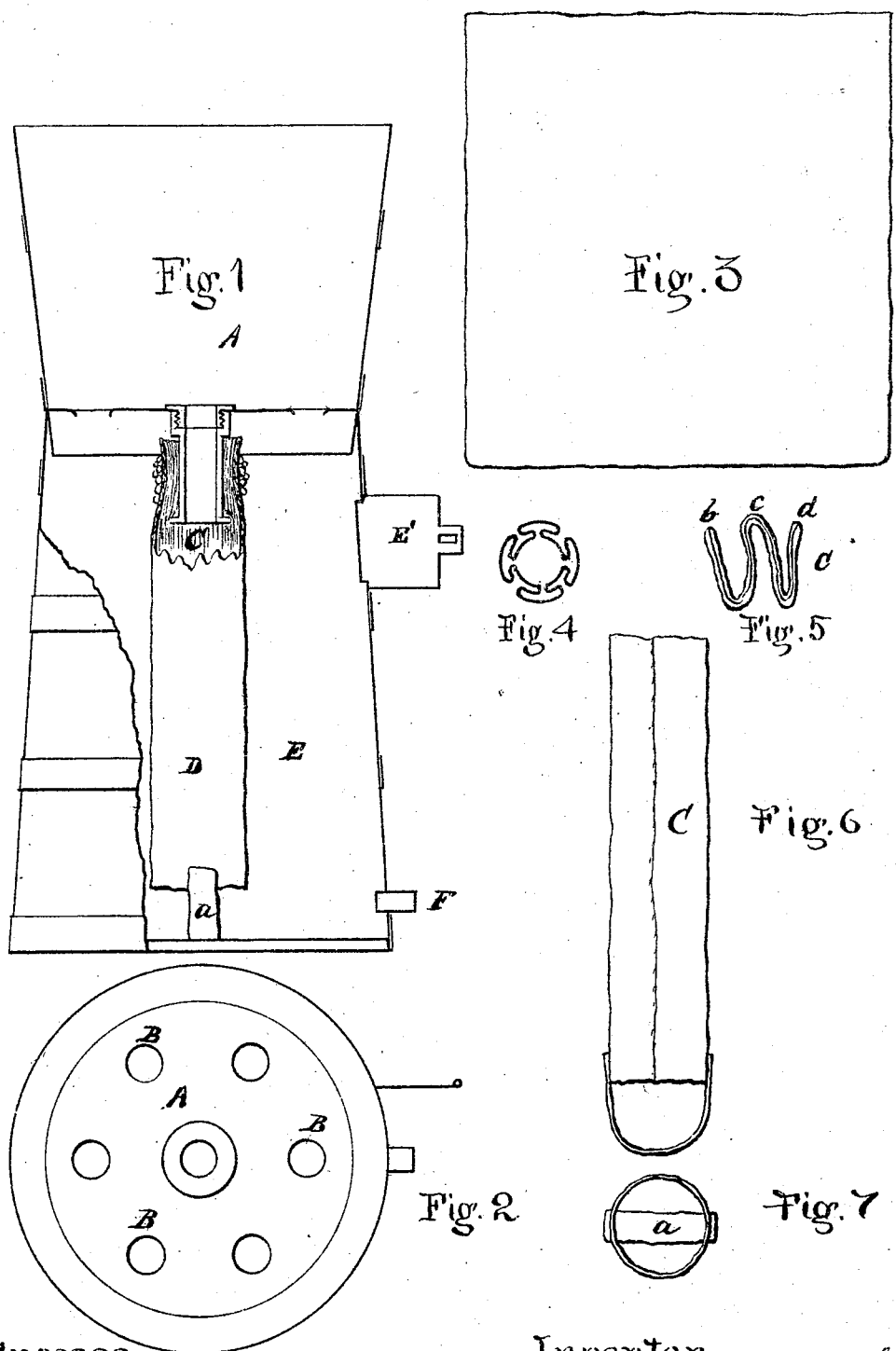

ized content.

UNITED STATES PATENT OFFICE.

AUGUST GOTTSCHALK, OF NAPA, CALIFORNIA.

IMPROVEMENT IN APPARATUS FOR CLARIFYING WINES.

Specification forming part of Letters Patent No. 119,460, dated October 3, 1871.

*To all whom it may concern:*

Be it known that I, AUGUST GOTTSCHALK, of Napa, in the county of Napa and State of California, have invented an Improved Apparatus for Clarifying Wines; and I do hereby declare that the following is a full and exact description of the same, reference being had to the accompanying drawing and to the letters of reference marked thereon.

The object of my invention is to provide an improved device for filtering wines, depriving them of their earthy flavor and vegetable matter remaining after the juice has been pressed from the pulp of the grape; and consists, mainly, in suspending by screw-couplings a series of peculiarly-constructed filters to the bottom of an elevated tank which is perforated with holes, so that the wine will be held in suspension until the column, by its great weight and pressure, will be gradually forced through the charcoal, which I employ as an auxiliary, and through the series of filtering material, and become clarified in a much more thorough and perfect manner than by any other device heretofore employed, as will hereinafter more fully appear.

In the drawing, Figure 1 is a side view, part section, part elevation, of my invention. Fig. 2 is a plan of same. Fig. 3 is a view of the broad side of the inner bag or sack spread out flat. Fig. 4 is a diagram, showing the manner of folding the mouth or upper end of the inner sack. Fig. 5 is a diagram, showing the folds of the lower end of the same. Fig. 6 is an elevation of the outer bag or tube. Fig. 7 is a plan of the same.

To enable others skilled in the art to which this invention most nearly appertains to make and use the same, I will now proceed to describe fully its construction and operation.

A represents a tank, the bottom of which is perforated with a series of holes, B, in which screw-couplings B' are fixed. To each of these screw-couplings is attached the filtering material, which consists of an inner sack, C, of duck, closed at the sides and bottom and folded three times, *b c d*, forming six thicknesses from outside to outside. This triple-folded sack is surrounded and confined by an outside case or cover, D, also of duck, which may be of a little finer material than the inner one, open at the bottom and top, and is provided with a handle, *a*, for convenience in withdrawing the inner sack. The end of the screw-coupling is introduced in the center as nearly as possible of the mouth of the inner sack, when both sacks are confined to the end of the coupling so that they will be suspended in a vertical manner. The tank A is elevated upon a reservoir, E, of the desired height, which is provided with a door, E', for convenience in unscrewing and removing the filters for cleansing. A cock, F, is placed at the base of the reservoir for drawing off the wine after it has passed through the filters.

The operation is as follows: The wine to be filtered is introduced with powdered charcoal into the tank A and passes down through the openings into the inner sacks until they become filled, and the tank also becomes full, when the pressure of the column of liquid forces out the inner closed sack against the sides of the outer cover or case, which, by reason of its being unyielding and smaller than the inner triple-folded sack, acts as a press and forces the wine through the charcoal and multiple folds of the inner sack, thus fining it in a perfect manner.

Having thus described my invention, I do not claim, broadly, a filter composed of one or several thicknesses of cloth or duck; but

What I do claim, and desire to secure by Letters Patent, is—

The sack C, consisting of three regular folds, *b c d*, when surrounded by a case or cover, D, of less dimensions, so that it will act as a press upon the fluid to be filtered, as described.

In witness whereof I have hereunto set my hand and seal.

AUGUST GOTTSCHALK. [L. S.]

Witnesses:
C. W. M. SMITH,
PHILIP MAHLER.

(18)